United States Patent [19]
Smith et al.

[11] 3,723,005
[45] Mar. 27, 1973

[54] WIDE ANGLE SIGHTING APPARATUS

[75] Inventors: Gene K. Smith, Vestal; Gene Tye, Endwell, both of N.Y.

[73] Assignee: General Electric Co.

[22] Filed: Dec. 13, 1965

[21] Appl. No.: 513,394

[52] U.S. Cl. .................... 356/29, 89/1.5 E, 356/152
[51] Int. Cl. ................................................. F41g 3/24
[58] Field of Search .............. 250/199; 88/1 Z, 1 W; 343/6 TU; 356/152, 141, 29; 89/1.5 E

[56] References Cited

UNITED STATES PATENTS

| | | | |
|---|---|---|---|
| 3,258,595 | 6/1966 | Galante | 250/199 |
| 3,262,210 | 7/1966 | Shapiro et al. | 88/1 Z |
| 3,300,777 | 1/1967 | Tarr | 343/6 TV |
| 3,305,633 | 2/1967 | Chernoch | 250/199 UX |

Primary Examiner—Benjamin A. Borchelt
Assistant Examiner—H. A. Birmiel
Attorney—Irving M. Freedman, Melvin M. Goldenberg, Frank L. Neuhauser, Oscar B. Waddell and Francis K. Richwine

[57] ABSTRACT

An airborne air-to-ground "wide angle" sighting device which avoids optical aberrations inherent in aligning sights and target with vision through transparencies which are not optically inert or caused by faulty alignment of eye and sight. Narrow beam light, preferably monochromatic, e.g. a laser, is projected from aircraft onto ground and pilot viewing illuminated spot through viewer which enhances spot against varied background uses spot as sight. Device includes means for orienting fixed or moving beam in predetermined relationship to aircraft or armament to allow for various parameters such as altitude, speed, trajectories, etc.

4 Claims, 3 Drawing Figures

WIDE ANGLE SIGHTING APPARATUS

This invention is directed to providing novel visual sighting apparatus for vehicle weapons delivery and analogous applications. It is particularly useful for delivering high drag projectiles in air-to-ground fire control.

In the past, precision sights have used a combining glass and associated components, or equivalent apparatus, for presenting a reticle aiming reference. The reticle represents a reference point in space at infinity which determines the line-of-sight from the observer. This apparatus requires components such as a reticle symbol light source, optical apparatus for projecting the reticle symbols on the combining glass, and adjustment and computer components. Sights have normally been placed directly in front of the pilot so that the reticle could be easily used. Generally, the optics includes a collimating lens arrangement so that the reticle presents the same line-of-sight, even when the observer's head moves sideways. Sights usually are structurally integrated with most of their associated electronic equipment, etc. for simplicity and convenience. In any event, cockpits and other vehicle control stations are generally overcrowded with instruments, and sights usually have sufficient bulk to contribute significantly to the space problems.

Furthermore, the placement of optical sight apparatus in front of a pilot results in the sight being dependent upon the windscreen refraction characteristics, etc. However, the windscreen must serve other observation and structural functions. Frequently, comprises are necessarily made in the sight mounting arrangement and result in vibration problems. Except for extending the angle of view much beyond 10°–25°, the optical and structural problems can generally be solved, but the resulting optical equipment is complex and elaborate.

In delivering conventional bombs and similar projectiles, practical tactical approaches are limited in number and generally result in the aircraft being highly vulnerable to anti-aircraft action during a bombing run. One reason for the constraints is that conventional sights provide only a limited field within which an aiming point can be presented. Accepted precision bombing tactics, whether level or diving, require that the aircraft follow a stereotyped approach including maintaining a horizontal (no roll) attitude and hence a constant course for a substantial time interval terminating at the release point. This results in a predictable and vulnerable flight path.

Conventional sights in vehicles face a number of additional problems which constrain vehicle tactics. It is frequently necessary for the pilot to move his head to the side to use the maximum field of view of the collimated light beam, even though this field is limited. A common major function in fire control computing sights is to visually track a target so that gyros and/or accelerometers can generate signals from which relative velocity data and the like can be obtained. This process requires manually aligning the aiming reference element, continuously, so that the sensors track the target. Commonly the aiming reference element is manually aligned by maneuvering the aircraft. In such tracking operations or in performing fire control by aiming on an offset target, etc., it is desirable to have the widest possible angle of view for the sighting apparatus, and that this angle of view be readily useable without side-to-side movement and the like.

Accordingly, it is an object of the invention to eliminate the restrictions on the area of view in sighting apparatus imposed by collimating lens systems and conventional sight optics.

It is another object of the invention to provide a computing sight system in which all or substantially all the sight apparatus is removed from its regular location on the operator's panel.

It is a further object of the invention to provide a computing sight which reduces errors due to windscreen refraction and vibration caused by cockpit mounting.

It is also an object of the invention to reduce the problems and complexities inherent in conventional optical sighting apparatus.

Briefly stated, in accordance with certain aspects of the invention, visual sighting apparatus is provided which uses a laser generated aiming reference. The laser beam is adapted to provide an accurate line-of-sight for visual observation by projecting an illuminated spot onto the terrain. Normally, the laser return is not at a visible wavelength and/or the light from the background scene is so much stronger that the laser spot can not be discerned. An image intensifier is provided to shift the laser spot wavelength and relatively suppress the background scene. An image results in which the accuracy of the line-of-sight observation is basically independent of the viewing optics. As long as the observer can put the laser spot on the actual desired point in the observed scene, the image intensifier resolution, etc., or windscreen distortion, or any other of the common optical error sources can not introduce any error.

Regular tracking sensors and/or fire control computers are employed to control the positioning of the laser beam in the same way as the reticle mirror has been positioned in prior sight apparatus. The most striking feature is that the conventional sight optics (normally including a combining glass, collimating lens system and reticle symbol light source) are eliminated and a practically unlimited area of view is provided with no more than an image intensifier required at the normally overcrowded control station of the operator. By projecting the laser spot on the terrain, the ultimate degree of integration between the controller's observed scene and the visual data generated by the control system is achieved.

The invention, together with further objects and advantages thereof, may best be understood by referring to the following description taken in conjunction with the appended drawings in which like numerals indicate like parts and in which:

FIG. 3 illustrates further details of the image intensifier shown in FIG. 1.

Figure 1:
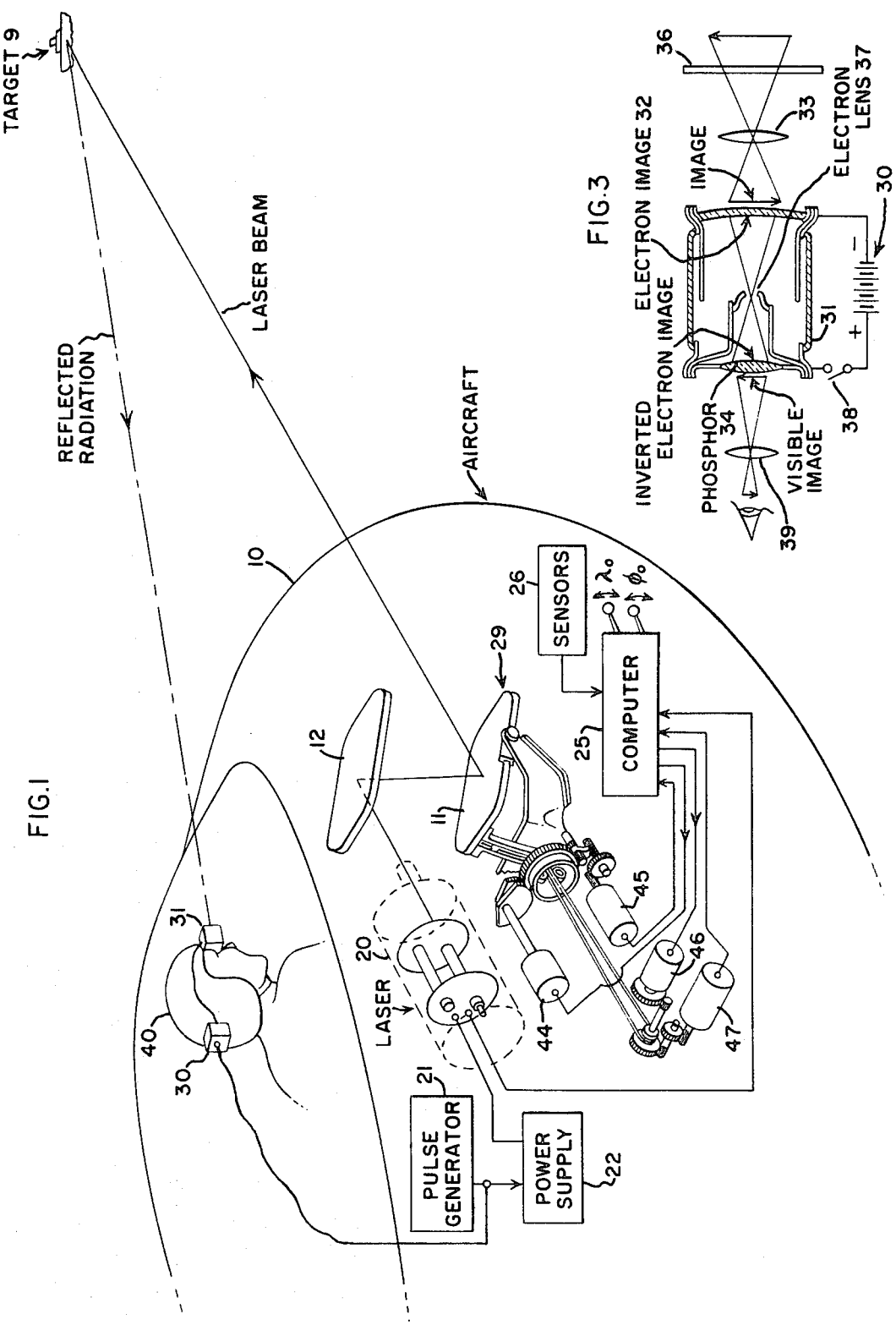
FIG. 1 illustrates schematically the novel sight system in which some components are shown in block form.

In the preferred embodiment for bombing from aircraft with relatively high drag projectiles, a window 10 is provided in the aircraft nose for the laser beam. It need only have sufficient dimensions to give the desired field of view and pass light at the laser beam frequency without distortion. The laser 20, preferably uses a neodymium laser material to generate light at about 1.06 microns in wavelength. It is conveniently of the type described in *Proceedings of the Symposium on Optical Masers*, Polytechnic Press, New York 1963, pp. 301-308, ("High Repetition Rate Pulsed Lasers" by W.R. Mallory and K.F. Tittel). Rather than provide precision servomotors and gimbals for a mass as great as the laser transmitter 20, a gimballed mirror 11 and a fixed mirror 12 direct the laser beam at the desired line-of-sight to the target. A pulse generator 21 fires the laser 20 by pulsing the laser power supply 22. A conventional bombing computer 25 in response to rate tracking signals and range signals from gyro sensors 26 and laser 20 drives gimballed mirror 11 so as to produce a proper lead angle.

It will be noted that the size and spacing of window 10 and mirrors 11 and 12 are exaggerated in FIG. 1 for purposes of illustration. For obtaining low cost, the mirrors and their motor control loops are preferably the same as reticle mirror drives in conventional sight optics. With the mirrors as close to the window 10 as possible, the window size is selected in accordance with the sight field-of-view requirements. Conveniently, the window 10 is glass or transparent plastic of a conventional windscreen material which is also transparent at the laser wavelength. A suitable laser is described in the above-cited article.

Conveniently mounted on the controller's helmet 40, the image converter 31 of FIGS. 1 and 3 is preferably of conventional construction of the type commonly called an infrared viewer and used for converting infrared light to visible wavelength while also increasing image brightness although any image intensifier or system of light amplification could be used. With conventional infrared materials, such as Ag-O-Cs for the photoemissive cathode and zinc cadmium sulphide for the cathodoluminescent phosphor, an adequate response to the 1.06 micron wavelength for a neodymium laser is provided for cathode 32 upon which lens 33 focuses the image. The resulting electron image is focused on the phosphor plane 34 by the electron optics 37. The visible image from the phosphors 34 is inverted by lens 33 and by the electron optics having a power supply 30. It is inverted again by viewing lens 39. The resulting image is essentially a monochromatic picture of the terrain or scene. While the laser return is used as the aiming point symbol, the observer really sees light from a small area of the terrain or scene illuminated by the intense laser light beam having a very narrow band of wavelengths. In order for this spot to be observed directly in the context of the scene, natural light from the background is relied upon without enhancement.

In the preferred embodiment, efficiency is a major determining factor in the system configuration. Pulses on the order of one megawatt peak power and 100 nanoseconds duration are desirable (average power of one tenth watts) under most conditions. While it is possible to specify a laser light source which can be viewed without an image intensifier, it is normally preferred to use a low average power laser. Furthermore, a strong visible laser beam might compromise the vehicle or its mission. In the absence of any background light, a laser return having an intensity sufficient to be observed with an image intensifier is readily obtainable. However, this is largely because the human eye is very sensitive and adaptable. In practice, the problem is not one of seeing the background scene, but one of avoiding loss of the laser return in the presence of a more intense background. Solution of the problem is achieved by rejecting light not at the laser frequency and operating the image intensifier and laser with a very low duty cycle. The latter is readily achieved by switch 38 energizing the electron optics 37 only in synchronism with laser 20 by virtue of common operation by pulse generator 21. The former, rejecting light not at the laser frequency, is performed by conventional filtering. Synchronous operation and filtering reduce the ratio of the background image to the laser image by several orders of magnitude. For darker backgrounds the ratio is easily decreased from the maximum so that the superimposed images can be observed and the sighting operation performed.

Figure 2:
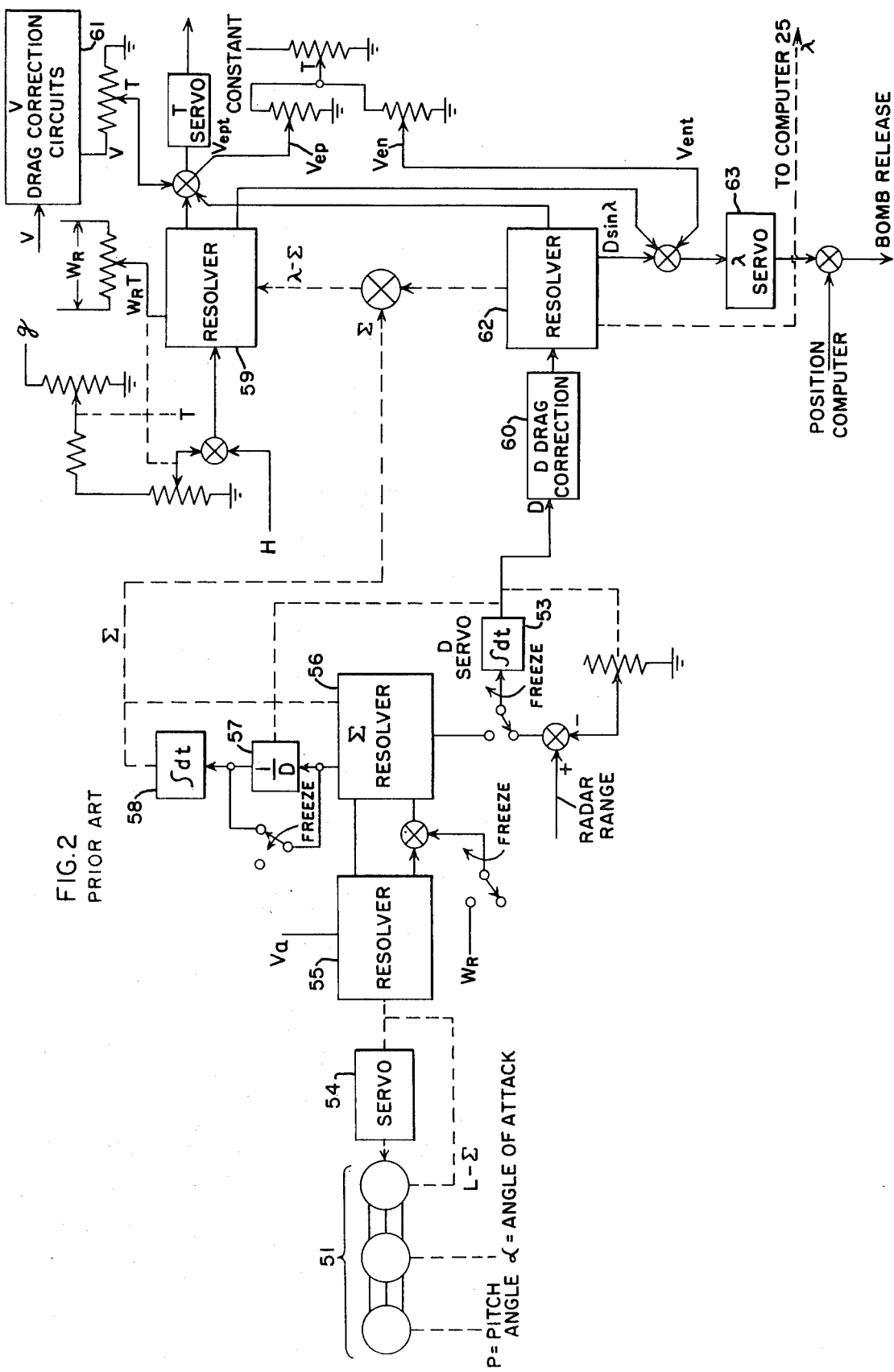
FIG. 2 illustrates a representative computer for use in the FIG. 1 system.

The invention can employ any computer which is adapted to control a line-of-sight reticle or the equivalent. The computer of FIG. 2 is an example of a satisfactory computer. This particular prior art computer is primarily directed to toss-bombing and takes advantage of doppler radar generated ground speed, etc. The computer operation is effectively initiated when the line-of-sight reference is aligned with the target so that the "freeze" switch can be manually operated. For example, the pilot can dive on the target, maintaining the aircraft velocity vector aimed at the target, and press the "freeze" switch whenever he feels confident that his dive angle and course are appropriate. The bombing equations used in the FIG. 2 computer are:

$$D = D_o + \int_{t_o}^{t} (V_a \cos L + W_R \cos \Sigma) dT$$

$$\Sigma = \Sigma_o + \int_{t_o}^{t} (V_a \sin L + W_R \sin \Sigma) dT$$

$$0 = VT - D \cos \lambda - \left[\frac{gT^2}{2} + H\right] \sin (\lambda - \Sigma) + W_R T \cos (\lambda - \Sigma) - V_{EP} T$$

$$0 = D \sin \lambda - \left[\frac{gT^2}{2} + H\right] \cos (\lambda - \Sigma) - W_R T \sin (\lambda - \Sigma) - V_{EN} T$$

where
 $V$ = aircraft velocity
 $T$ = bomb time of flight
 $D$ = slant range to target
 $\lambda$ = release angle
 $S$ = acceleration due to gravity
 $H$ = burst height
 $\Sigma$ = sight depression
 $W_R$ = range wind
 $V_{EP}$ = bomb ejection velocity (Parallel)
 $V_{EN}$ = bomb ejection velocity (normal)
 $L$ = angle between flight path direction and target line-of-sight
 $V_a$ = airspeed
 $t$ = computation time $t_o$ = time of freeze
$\tau$ = real time The mechanization of these bombing equations is preferably with conventional analog components. The pitch angle P and angle of attack $\alpha$ from the flight control system are summed by the synchro 51–53 to provide $L - \Sigma$. Resolvers 55 and 56 solve the first two equations in conjunction with integrators 53 and 58 and divider 57. Servo 54 provides the $L - \Sigma$ angular input to resolver 55. The second pair of equations are solved by resolvers 59 and 62. The ballistic factors are introduced for the bomb release factor and fuse setting by respective function generators 60 and 61. By driving laser mirror 11's servomotor 46 by servo 63, the laser provides the desired aiming reference. In order that the laser spot be maintained steady, it is adjustable to include the conventional stabilizing signals for mirrors 11 and 12 in the same manner as for conventional sight mirrors.

The sighting arrangement of this invention can be employed for applications analogous to fire control such as aircraft landing aids. In landing, the primary requirement is to produce a desirable flight path profile. For a given speed, there is an optimum height profile terminating at touchdown. Normally, a plane can be placed on the proper course so that alignment with the desired runway is not a problem. The proper height profile can be readily achieved by controlling the aircraft in accordance with the line-of-sight provided by the laser spot on a landing field reference point. While not necessary to employment of the invention, the use of an image intensifier for observing landing field beacons makes improvements possible in effective runway lighting, etc.

A laser beam is the only known light source which can produce a sufficiently bright and small reference spot at ranges greater than one mile. For accurate sighting functions, the light spot must appear to be on the order of one milliradian in diameter. This almost requires that the light be a coherent monochromatic electromagnetic radiation in the range of wavelengths normally covered by the term light. Accordingly, any light source, whether or not a stimulated emission of radiation kind of physical phenomena presently associated with the term laser, could be used if it were capable of producing the same kind of small light spot at great distances. The invention is directed to enabling manual control operations on the basis of information derived by observing surrounding terrain and external information. Whether the external information is from a sophisticated fire control computer or a simple predetermined factor, it is integrated with the terrain information by projecting a line-of-sight determining light spot on the terrain. As opposed to a cathode ray tube type of reconstruction, the present invention creates pictorial information directly by projecting the reference spot itself onto the real terrain in a form where it can be used directly by the controller. Although it is only a point in space, the light spot is direct pictorial information as integrated with the scene. A shift in wavelength by an image intensifier, if any, can be considered merely changing the color of the information. When the image intensifier is used to detect whether or not the light spot is properly aligned, it is basically performing a nulling function.

With radar type apparatus, the operator must rely on proper alignment of the antenna drive, etc., when he ascribes a radar range output to a particular direction, but with the present invention the observer literally sees the object ranging signals. Conversely, a set of laser range readings can be used to aid the line-of-sight operations. For example, the mirror gimbal pick-offs can be aligned using range readings in a test set-up having known range-angle relations.

While particular embodiments of the invention have been shown and described herein, it is not intended that the invention be limited to such disclosure, but that changes and modifications can be made and incorporated within the scope of the claims.

What is claimed is:

1. In an aircraft control system, the combination of:
   a. a source of a narrow beam of light mounted on the aircraft;
   b. means for projecting said beam of light out of said aircraft along a predetermined direction with respect to said aircraft; and
   c. viewing means fixed with respect to and moveable with the pilot's line of vision for enabling said pilot to distinguish the point of impact of said beam on terrain flown over by said aircraft while moving his line of vision without causing optical aberrations affecting orientation of said point of impact with respect to said terrain whereby said point of impact will constitute an aiming point.

2. Airborne wide angle sighting apparatus for an aircraft control system comprising:
   a. means attached to an aircraft for generating a narrow, intense beam of substantially monochromatic light;
   b. reflecting means for directing said beam out of said aircraft in a predetermined direction with respect to said aircraft so that impact of said beam with the terrain over flown illuminates a spot on said terrain with respect to which said aircraft has a predetermined attitude;
   c. light viewing means moveable with the pilot of said aircraft and interdicting the sight of one eye of said pilot to permit him to maintain unimpaired observation of said spot while performing normal functions; and
   d. said light viewing means including means for enhancing visibility of said spot against the terrain background whereby said pilot sees said spot as a bright spot on the terrain.

3. Airborne wide angle sighting apparatus for an aircraft control system comprising:
   a. laser means attached to an aircraft for generating a narrow, intense pulsed beam of substantially monochromatic light;
   b. adjustable reflecting means for directing said beam out of said aircraft in a predetermined direction with respect to said aircraft;
   c. means responsive to flight parameters of said aircraft for determining the proper direction and for driving said means for directing to align said beam so that impact of said beam with the terrain over flown illuminates a spot on said terrain representing the ground point to which said aircraft has a predetermined orientation at any time;
   d. light viewing means interdicting the sight of one eye of the pilot and being fixed with respect to said eye to permit said pilot to observe said spot while performing normal functions without causing optical aberrations affecting the location of said spot on said terrain;

e. said light viewing means including:
1. filter means for removing a portion of the polychromatic light spectrum reflected by the terrain background; and
2. image intensifier means amplifying the laser radiation reflected from said spot;

f. said image intensifier means being pulsed synchronously with said laser means to enhance contrast between said spot and said background.

4. Airborne wide angle sighting apparatus for an aircraft control system comprising:

a. laser means attached to an aircraft for generating a narrow, intense pulsed beam of substantially monochromatic light in the infrared spectrum;

b. reflecting means gimballed about two axes for directing said beam out of said aircraft in a predetermined direction with respect to said aircraft;

c. automatic computing means responsive to flight parameters of said aircraft for determining the proper direction and for driving said means for directing according to such determination to direct said beam so that impact of said beam with the terrain over flown illuminates a spot on said terrain with respect to which said aircraft has a predetermined orientation at any time;

d. light viewing means interdicting the sight of one eye of the pilot and being mounted for movement with said pilot to permit said pilot to observe said spot while performing normal functions without causing optical aberrations which would affect the said orientation of the aircraft;

e. said light viewing means including:
1. filter means for removing a substantial portion of the visible light spectrum reflected by the terrain background;
2. image intensifier means amplifying the laser infrared radiation reflected from said spot, and
3. infrared viewing means converting said reflected laser infrared radiation to energy frequencies visible to said pilot whereby said pilot sees said spot as a bright spot on the terrain;

f. said image intensifier means being pulsed synchronously with said laser means to enhance contrast between said spot and said background.

* * * * *